United States Patent [19]

Hennecke et al.

[11] Patent Number: 4,761,947
[45] Date of Patent: Aug. 9, 1988

[54] GAS TURBINE PROPULSION UNIT WITH DEVICES FOR BRANCHING OFF COMPRESSOR AIR FOR COOLING OF HOT PARTS

[75] Inventors: Dietmar Hennecke, Rossdorf; Klaus Pfaff; Dietrich Grigo, both of Munich, all of Fed. Rep. of Germany

[73] Assignee: MTU Motoren- Und Turbinen- Union München GmbH, Munich, Fed. Rep. of Germany

[21] Appl. No.: 853,658

[22] Filed: Apr. 18, 1986

[30] Foreign Application Priority Data

Apr. 20, 1985 [DE] Fed. Rep. of Germany ....... 3514352

[51] Int. Cl.⁴ .............................................. F02C 7/12
[52] U.S. Cl. .................................. 60/39.75; 60/39.83; 415/115; 415/176
[58] Field of Search ...................... 60/39.07, 726, 728, 60/39.75, 39.83; 415/115, 176

[56] References Cited

U.S. PATENT DOCUMENTS

| | | |
|---|---|---|
| 2,640,319 | 6/1953 | Wislicenus . |
| 2,648,519 | 8/1953 | Campini .................. 60/39.75 |
| 2,951,337 | 9/1960 | Atkinson et al. ........... 60/39.75 |
| 3,034,298 | 5/1962 | White .................... 415/176 |
| 3,422,623 | 1/1969 | Scott . |
| 3,452,542 | 7/1969 | Saferstein et al. ......... 60/39.75 |
| 3,742,706 | 7/1973 | Klompas .................. 60/726 |
| 3,844,110 | 10/1974 | Widlanski et al. ......... 60/726 |
| 4,120,150 | 10/1978 | Wakeman . |
| 4,127,988 | 12/1978 | Becker ................... 60/39.75 |
| 4,187,675 | 2/1980 | Wakeman ................. 60/39.75 |
| 4,217,755 | 8/1980 | Williams ................ 60/39.75 |
| 4,462,204 | 7/1984 | Hull .................... 60/39.07 |
| 4,542,623 | 9/1985 | Hovan et al. ............. 415/176 |

FOREIGN PATENT DOCUMENTS

| | | |
|---|---|---|
| 2035423 | 2/1971 | Fed. Rep. of Germany . |
| 1951356 | 4/1971 | Fed. Rep. of Germany . |
| 2003206 | 8/1971 | Fed. Rep. of Germany . |
| 2261443 | 7/1973 | Fed. Rep. of Germany . |
| 2831801 | 2/1979 | Fed. Rep. of Germany . |
| 2835903 | 3/1979 | Fed. Rep. of Germany . |
| 56-72224 | 6/1981 | Japan . |
| 736503 | 9/1955 | United Kingdom . |
| 1039650 | 8/1966 | United Kingdom . |
| 1158634 | 7/1969 | United Kingdom . |
| 2093532A | 9/1982 | United Kingdom ........ 60/39.07 |
| 2108202A | 5/1983 | United Kingdom ........ 415/115 |

*Primary Examiner*—Donald E. Stout
*Attorney, Agent, or Firm*—Barnes & Thornburg

[57] ABSTRACT

In a gas turbine propulsion unit with means for branching off compressor air for purposes of cooling hot parts of the turbine, the cooling air is conducted to the hot parts to be cooled along a detour by way of structural parts of high heat capacity and large surface area. It is achieved therewith that with a jump-like change of the cooling air temperature as, for example, during an acceleration operation, the cooling air gives off a portion of its heat content along the detour to the structural parts so that the thermal time behavior of the cooling air is slowed down.

17 Claims, 6 Drawing Sheets

GAS TURBINE PROPULSION UNIT WITH DEVICES FOR BRANCHING OFF COMPRESSOR AIR FOR COOLING OF HOT PARTS

The present invention relates to a gas turbine propulsion unit including compressor, combustion chamber and turbine(s) and having devices for branching off compressor air for cooling hot parts of the turbine(s), especially of the turbine rotor.

In gas turbines with high turbine inlet temperatures, hot parts such as turbine disks and blades are cooled with air according to the usual state of the prior art, which is branched off out of the mainstream in or downstream of the compressor and which is conducted to the turbine. With rapid load changes of the propulsion unit, as are characteristic above all for aircraft and vehicle gas turbines, the temperature of the cooling air changes correspondingly rapidly to the new value (in few seconds). This rapid temperature change of the cooling air means that thin-walled hot parts which are acted upon by the cooling air, such as parts of the turbine disk, flange connections, labyrinth seals, disk rings, etc. change their temperature equally rapidly. Since, however, for example, the thicker areas of the turbine disk with its larger mass follows only very much slowly the temperature changes of the cooling air, large temperature differences result temporarily between thick-walled and thin-walled parts so that high thermal stresses occur which may lead to the reduction of the length of life or even to fractures.

Such effects may occur above all in rotor disks but also at turbine blades. The temperatures of the blades are determined essentially by the temperature of the hot gases flowing externally about the blade and the temperature of the cooling air conducted through the blade on the inside thereof. With a rapid load change, hot gas and cooling air temperature change rapidly which also leads to temporary large temperature gradients in the blade walls which may cause high thermal stresses and therewith a reduction of the length of life, respectively, fractures.

A considerable improvement of this situation would be achieved if the cooling air or at least the portion of the cooling air flowing about the thin-walled parts, changed its temperature only slowly during rapid load changes.

The object of the present invention is therefore to provide a gas turbine propulsion unit of the aforementioned type which by appropriate construction of the cooling air conductance has a slow (sluggish) thermal time behavior of the cooling air.

The underlying problems are solved according to the present invention in that the cooling air branched off from the compressor is conducted to the hot parts of the turbine to be cooled through appropriate cooling air paths and passages along a detour by way of structural parts of high heat capacity and large surface area and said structural parts being so selected that in the steady operation of the propulsion unit the temperature difference between the structural parts of high heat capacity and the cooling air is as small as possible.

As a result of the construction according to the present invention in which the cooling air, in contrast to the state of the art, is conducted over a path, where a considerable heat-exchange between the cooling air and the structural components of high heat capacity and large area is achieved in the non-steady (transient) operating case, a considerable slowing down of the thermal time behavior of the cooling air is achieved, whereas in the steady operation of the propulsion unit there will occur nearly no heat exchange because of the same temperature level of the said structural parts and the cooling air.

In a first preferred embodiment of the present invention, the structural parts of high heat capacity are propulsion unit components such as compressor disks, shafts or housing walls, whereby additional structural weight for achieving the desired effect is avoided and the structural expenditures can be kept particularly small.

According to another embodiment of the present invention, the structural parts of high heat capacity are additional walls inserted into the cooling air guidance and lengthening the flow path of the cooling air. By such additional structural parts of high heat capacity provided in the propulsion unit, the desired effect can be produced to a greater extent, whereby of course a combination of this second embodiment of the invention with the aforementioned first embodiment may also be provided.

An advantageous construction is achieved by the present invention in that the structural parts of high heat capacity have a surface configuration increasing the heat transfer such as, for example, ribs, pimples, pin-fins or the like.

Finally, for achieving a slow thermal time behavior of the cooling air, it is advantageous if the structural parts of high heat capacity and large surface area are gas-permeable structures in the manner of heat-exchanger matrices. Permeable porous materials or layers of wire mesh or also globular fill can be used as such gas-permeable structures which are inserted, respectively, installed into the cooling air guidances.

The effect desired according to the present invention of a slow thermal time behavior of the cooling air is achieved in particular if as proposed for a preferred embodiment of the present invention, the structural parts of high heat capacity and large surface are insulated with respect to other cooling medium flows.

These and other objects, features and advantages of the present invention will become more apparent from the following description when taken in connection with the accompanying drawing which shows, for purposes of illustration only, several embodiments in accordance with the present invention, and wherein.

Figure 1:
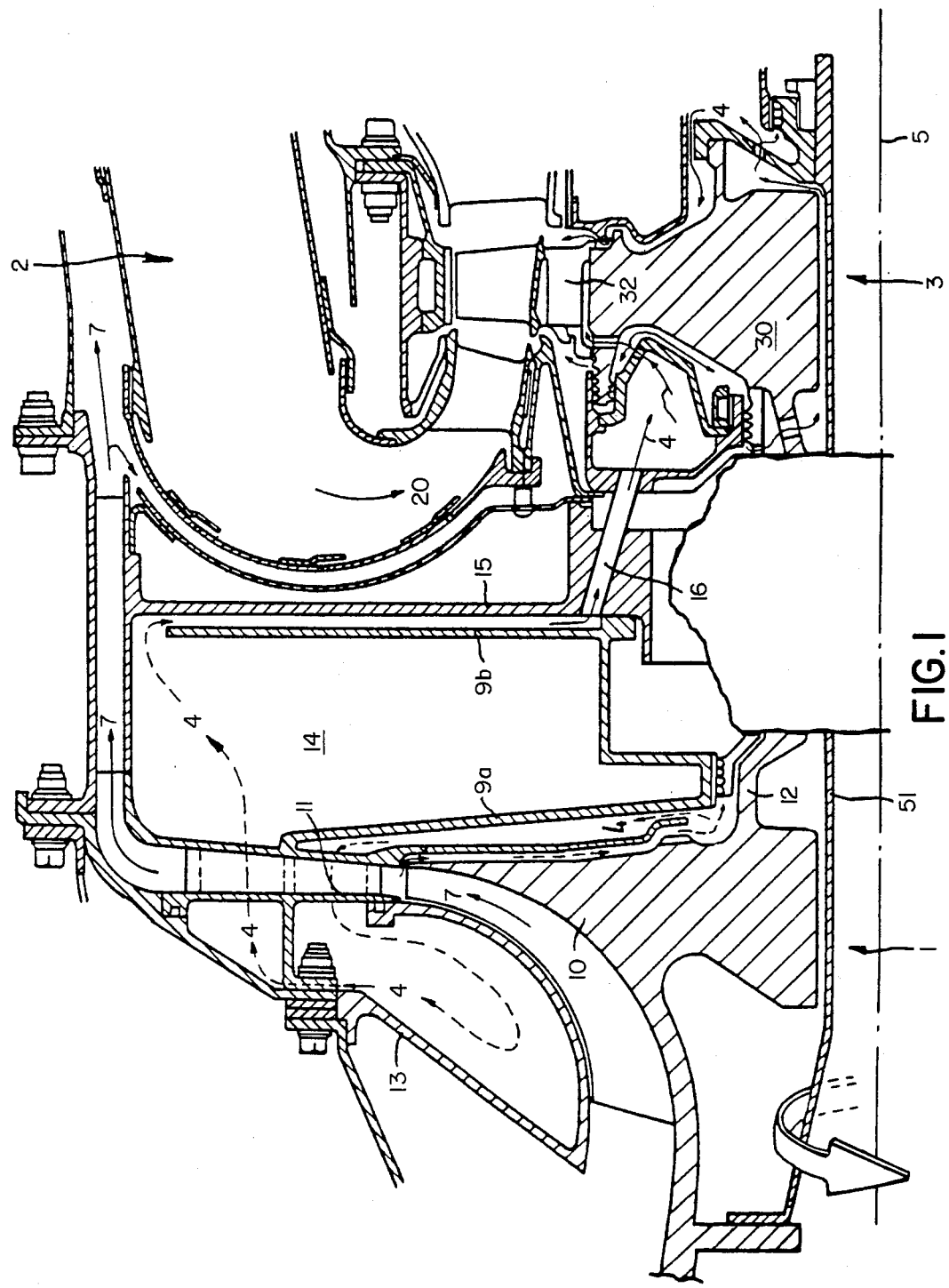
FIG. 1 is a longitudinal cross-sectional view through a gas turbine propulsion unit according to the present invention.
Figure 5:
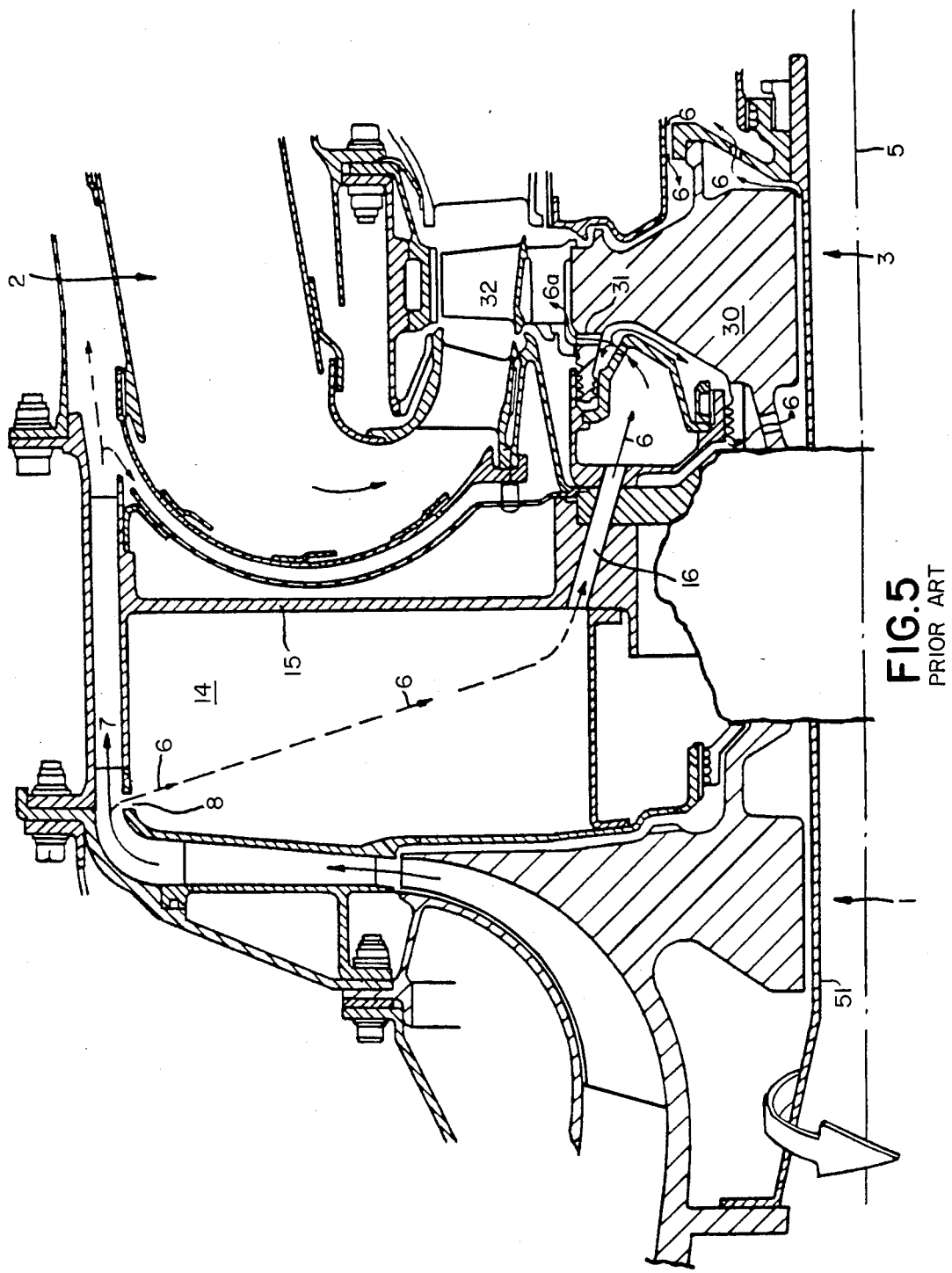
Figure 6:
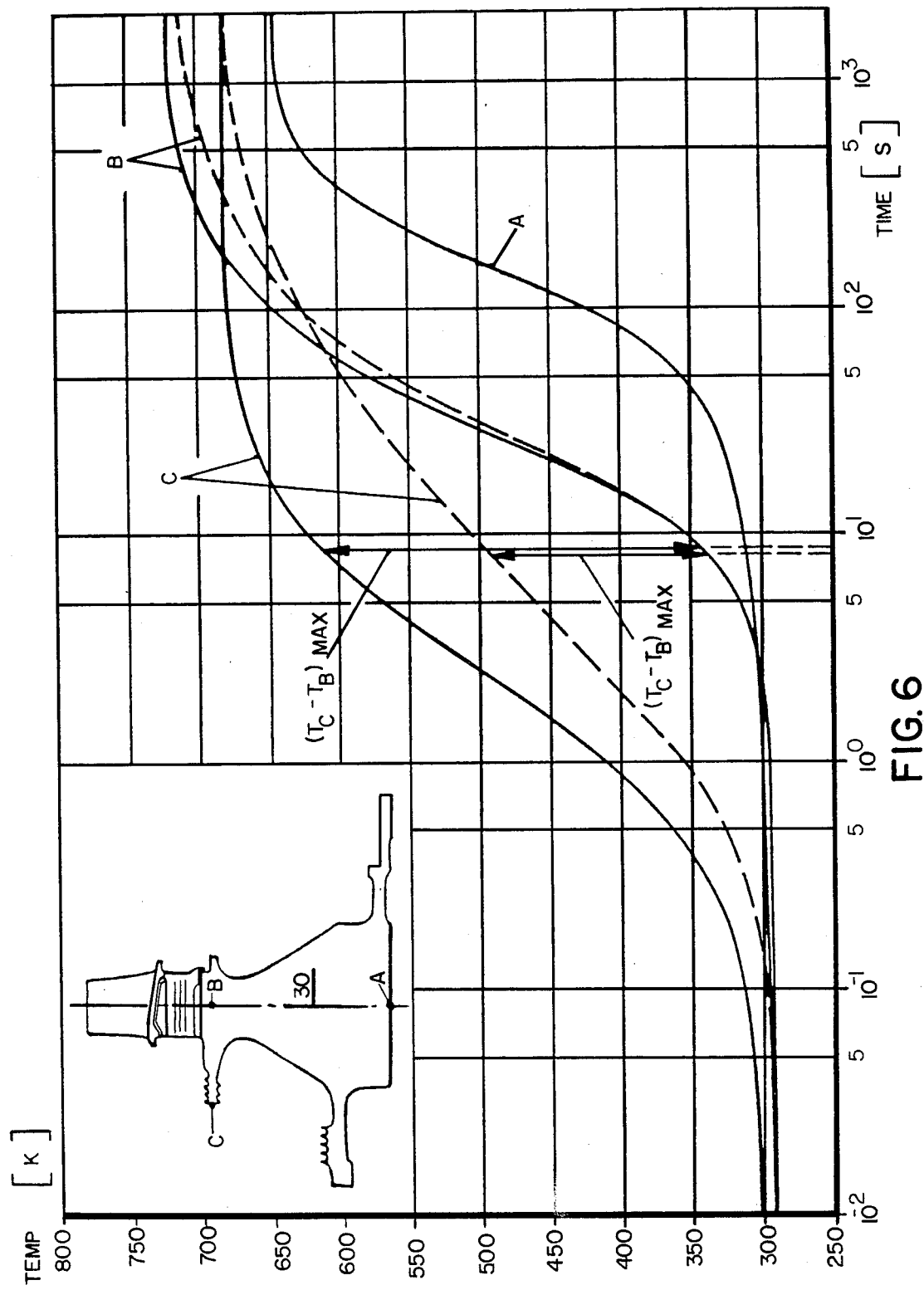

FIG. 5 is a longitudinal cross-sectional view of a gas turbine propulsion unit similar to FIG. 1, but of prior art construction; and FIG. 6 is a graphic representation of the temperature curve as a function of the time in the disk hub, disk rim and labyrinth ring of a turbine rotor, in each case in comparison between a prior art propulsion unit and a propulsion unit constructed in accordance with the present invention.

Referring now to the drawing wherein like reference numerals are used throughout the various views to designate like parts, the longitudinal cross section of a typical gas turbine propulsion unit for the delivery of shaft output of conventional construction is illustrated in FIG. 5 for facilitating an understanding of the present invention. FIGS. 1 to 4 illustrate how this propulsion unit of the prior art of FIG. 5 is to be modified corresponding to the present invention. The propulsion unit according to FIG. 5 includes a compressor generally designated by reference numeral 1 with a radial end stage, a combustion chamber generally designated by reference numeral 2 and a turbine generally designated by reference numeral 3. The central longitudinal axis of the propulsion unit is designated by reference numeral 5. A central shaft is designated by reference numeral 51. Downstream of the compressor 1, cooling air is branched off at a location 8 from the main air stream 7 leading to the combustion chamber 2, which according to the prior art is conducted along the shortest practical path to the turbine 3. The path is indicated in dash lines and with arrows and designated by reference numeral 6. It leads, starting from the place 8, through a compressor interior space 14 which is delimited with respect to the combustion chamber 2 by a radial wall 15 and from there through a cooling air channel 16 directly to the turbine disk 30. The main portion of the cooling air flows about the entire surface of the turbine disk 30 whereas a smaller portion 6a of the cooling air is branched off through cooling air channels 31 to the blade root area of the turbine disk 30 for cooling the rotor blades 32.

The part of the longitudinal cross section of a gas turbine propulsion unit illustrated in FIG. 1 corresponds essentially to that of FIG. 5 whereby the same components are designated with the same reference numerals as in FIG. 5. In contrast to the prior art construction according to FIG. 5, the cooling air is conducted according to this invention from the compressor 1 to the hot parts of the turbine 3 to be cooled over a detour for purposes of slowing down its thermal behavior. This detour is indicated in dash lines and by arrows pointing in the flow direction and designated by reference numeral 4. Still prior to the entry of the main air flow 7 into the diffusor 11 of the compressor 1, a cooling air portion is removed from the main air flow and is initially conducted by way of the back side of the radial compressor wheel 10 as well as by way of the shaft flange 12, thereupon along a radially extending housing partition wall 9a through hollow blades of the radial compressor diffusor 11 and along the inner surface of the compressor housing 13. From there, the path of the cooling air leads again by way of hollow spaces in the outer part of the radial compressor diffusor blades into the compressor interior space 14 where the cooling air is conducted along the radial wall 15 to the cooling air channel 16 by means of a further radially extending housing partition wall 9b. The further path of the cooling air proceeds as shown in FIG. 5 and described above.

Figure 2:
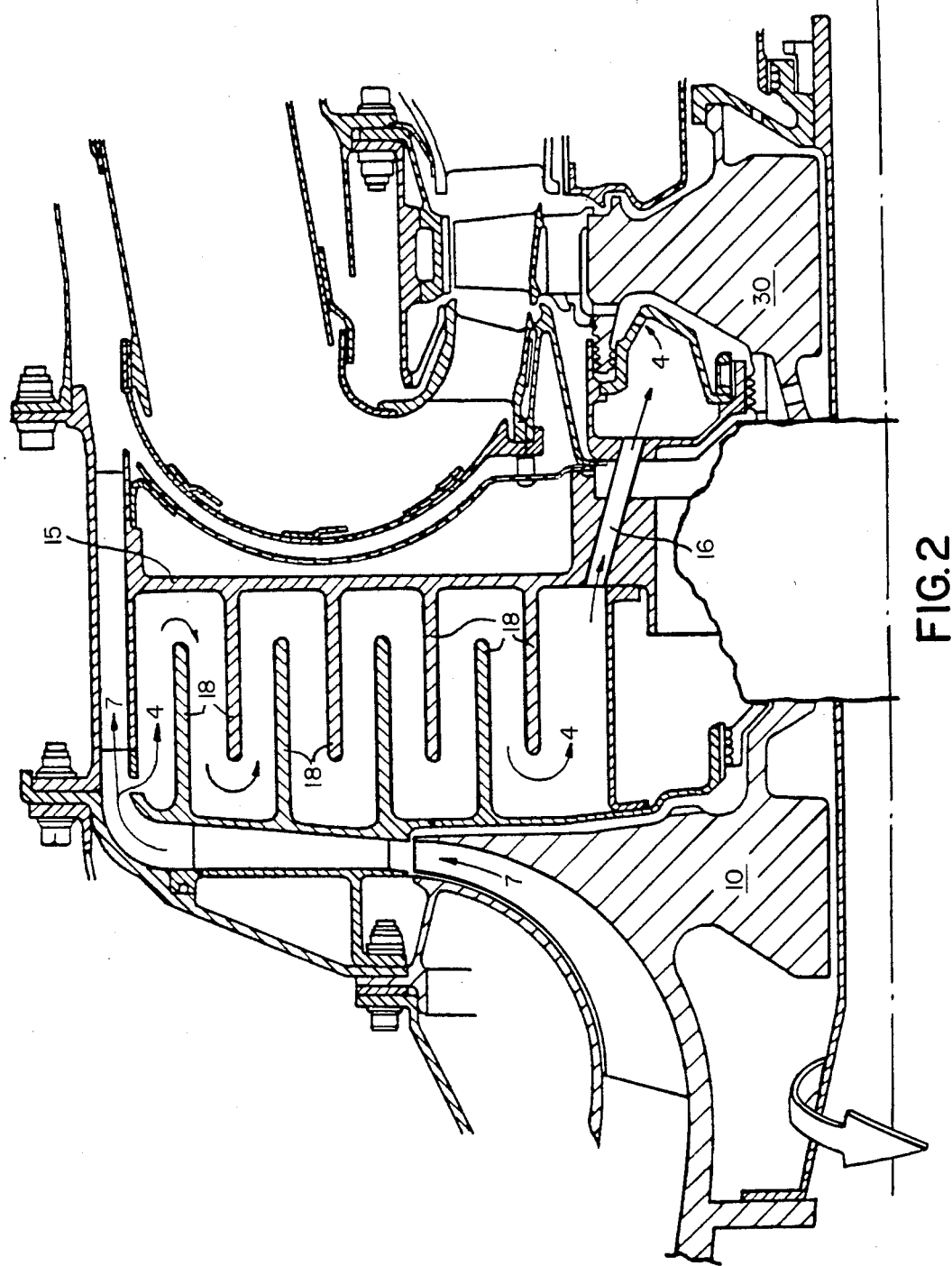
FIG. 2 is a modified embodiment of a longitudinal cross-sectional view through a gas turbine propulsion unit in accordance with the present invention, similar to FIG. 1, but with a changed flow path of the cooling air.
Figure 3:
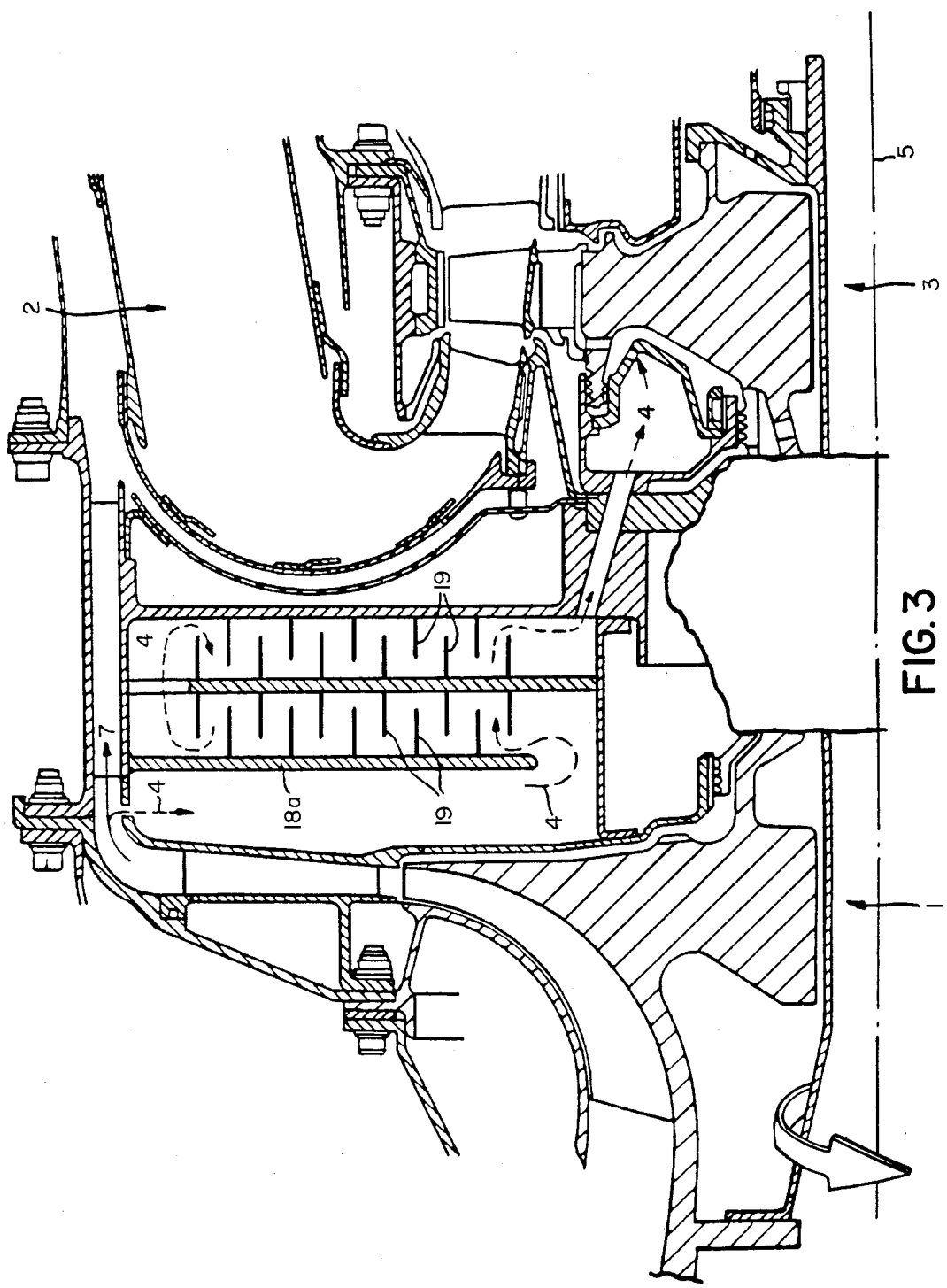
FIG. 3 is a further modified embodiment of a gas turbine propulsion unit in accordance with the present invention, similar to FIG. 1.

As shown in FIG. 2, for purposes of slowing down the thermal behavior of the cooling air, walls 18 may be inserted as an alternative to the measures according to FIG. 1 or also in addition thereto, into the cooling air guidance which lengthen the flow path of the cooling air. In the illustrated embodiment according to FIG. 2, the cooling air is conducted meander-shaped by the arrangement of the walls 18 whereby it exchanges heat with the walls 18. A sudden or jump-like increase of the temperature of the cooling air at the compressor outlet is flattened off in that the cooling air gives off a part of its heat, for example, at these walls 18. Another arrangement of walls 18 lengthening the flow path of the cooling air is illustrated, for example, in FIG. 3. Also, in this embodiment the cooling air is conducted meander-shaped. However, the corresponding walls 18a extend in the radial direction in relation to the central propulsion unit longitudinal axis 5. For increasing the heat-exchange between the cooling air and these walls 18a, ribs 19 are provided in the embodiment according to FIG. 3. However, in the same manner or in addition thereto, pimples or pin-fins or the like may be used which increase the turbulence of the cooling air flow and the heat-transferring surface.

Figure 4:
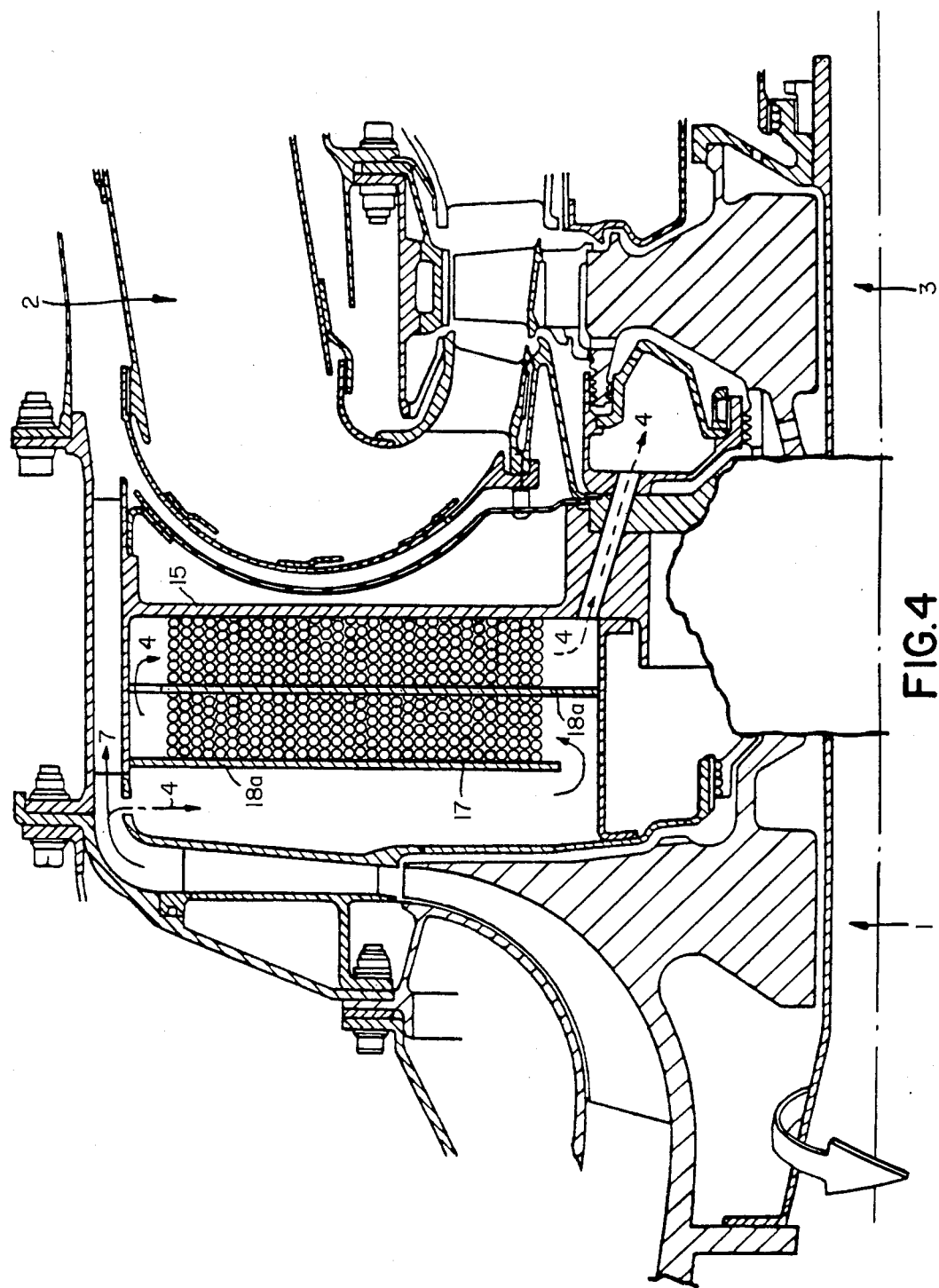
FIG. 4 is a longitudinal cross-sectional view through a gas turbine propulsion unit similar to FIG. 1, however, with a cooling air path through a gas-permeable structure.

In the further embodiment of the present invention illustrated in FIG. 4, a gas-permeable structure in the manner of a heat-exchange matrix is provided between the radial wall 15 and the walls 18a; the cooling air flows through this gas-permeable structure and exchanges heat with the same. This gas-permeable structure may consist of a porous material, of layers of wire mesh or of a ball fill 17, as shown in FIG. 4. As in the embodiments according to FIGS. 2 and 3, also the construction according to FIG. 4 may be provided in addition to the cooling air guidance according to FIG. 1.

The effect of the cooling air guidance in accordance with the present invention according to FIGS. 1 to 4, is represented in the diagram according to FIG. 6. The time is plotted along the abscissa of this diagram on a logarithmic scale while the temperature in K is indicated along the ordinate. In the left upper corner of the diagram, the turbine rotor 30 of the gas turbine propulsion unit illustrated in FIGS. 1 to 5 is shown, and three temperature-measuring places A, B and C are indicated in this turbine rotor 30.

For each of these temperature-measuring places A, B and C, the temperature curves plotted against time are indicated in the case of acceleration of the gas turbine propulsion unit and more particularly once for a propulsion unit with prior art cooling air guidance according to FIG. 5 in full line and another time for a propulsion unit according to FIGS. 1 to 4 in accordance with the present invention in dash lines. The difference value $(T_C - T_B)_{max}$, i.e., the maximally occurring temperature differences between the measuring place C and the measuring place B differ for the dash line curves and the full line curves to a considerable extent. With the cooling air guidance in accordance with the present invention, the maximally occurring temperature difference between the place B and the place C at the turbine rotor is very considerably smaller and, accordingly, thermal stresses occur to a correspondingly lesser extent.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A gas turbine propulsion unit, comprising: compressor means; combustion chamber means; turbine means; and heat exchange path means for branching off compressor air for cooling hot parts of the turbine means; said heat exchange path means being in heat exchange relationship with heated structural parts of the propulsion unit, which parts substantially retain their heat content even upon an initiation of increase in loading on the propulsion unit, to maintain substantially constant the temperature of the branched off cooling compressor air upon changes in loading of the propulsion unit to avoid sudden changes in the temperature of the cooling air fed to the hot parts of the turbine and wherein said heat exchange path leads from an outlet area of said compressor in heat exchange relationship along a backside of the compressor, through a hollow blade of a compressor diffusor to an area adjacent a frontside of the compressor and from there to the turbine means.

2. A propulsion unit according to claim 1, wherein the hot parts of the turbine means include a turbine rotor.

3. A propulsion unit according to claim 1, wherein the heated structural parts are propulsion unit components.

4. A propulsion unit according to claim 3, wherein the propulsion unit components include at least one of compressor disks, shafts, and housing walls.

5. A propulsion unit according to claim 4, wherein the compressor means includes a radial compressor rotor and wherein the heat exchange path means leads the branched off cooling air initially along the back side of the radial compressor rotor, thereupon by way of hollow blades of a radial compressor diffusor and finally along housing walls of the compressor means.

6. A propulsion unit according to claim 5, wherein the heated structural parts are walls inserted into a cooling air path means and lengthening the flow path of the cooling air.

7. A propulsion unit according to claim 6, wherein the heated structural parts include surface configurations increasing the heat transfer to the cooling air.

8. A propulsion unit according to claim 7, wherein said surface configurations include at least one of ribs, pimples, pin-fins and the like.

9. A propulsion unit according to claim 1, wherein the heated structural parts are gas-permeable structures in the manner of heat-exchanger matrices.

10. A propulsion unit according to claim 9, wherein permeable porous materials are inserted into the cooling air flow path means as gas-permeable structures.

11. A propulsion unit according to claim 9, wherein layers of wire mesh are inserted into the cooling air flow path means as gas-permeable structures.

12. A propulsion unit according to claim 9, wherein a globular fill is used as gas-permeable structure.

13. A propulsion unit according to claim 1, wherein the compressor means includes a radial compressor rotor and wherein the heat exchange path means leads initially along the back side of the radial compressor rotor, thereupon by way of hollow blades of a radial compressor diffusor and finally along housing walls of the compressor means.

14. A propulsion unit according to claim 1, wherein the heated structural parts are walls inserted into the cooling air flow path and lengthening the flow path of the cooling air.

15. A propulsion unit according to claim 1, wherein the heated structural parts include surface configurations increasing the heat transfer to the cooling air.

16. A propulsion unit according to claim 15, wherein said surface configurations include at least one of ribs, pimples, pin-fins and the like.

17. A propulsion unit according to claim 1, wherein the heated structural parts are insulated with respect to other cooling medium streams.

* * * * *